Aug. 14, 1934.   A. B. STEELE   1,969,767
DOOR OPENING AND CLOSING DEVICE
Filed June 9, 1932
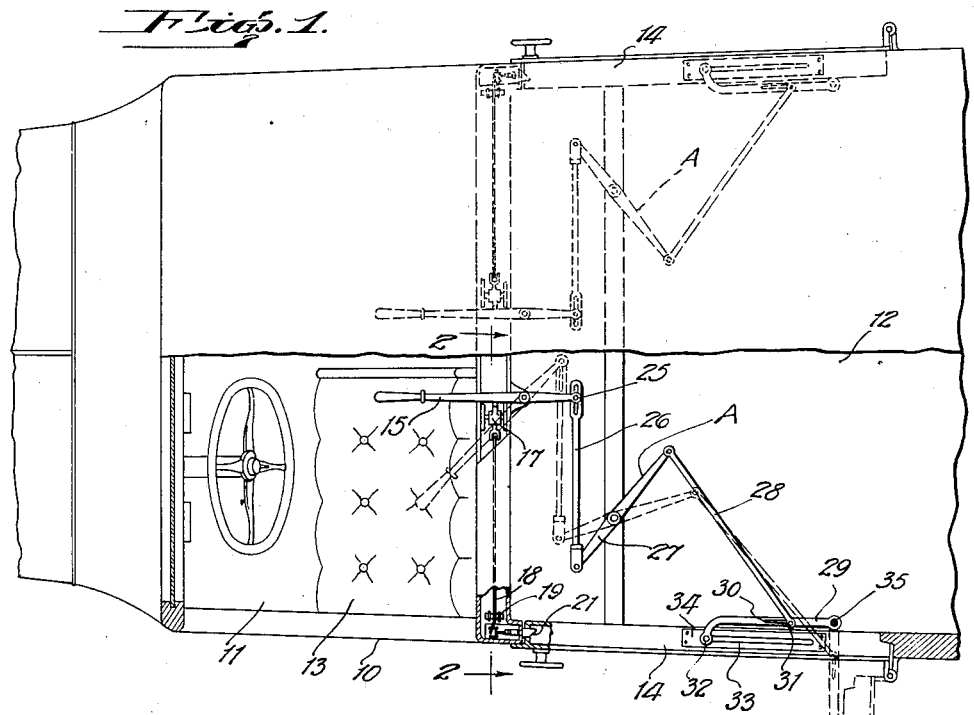
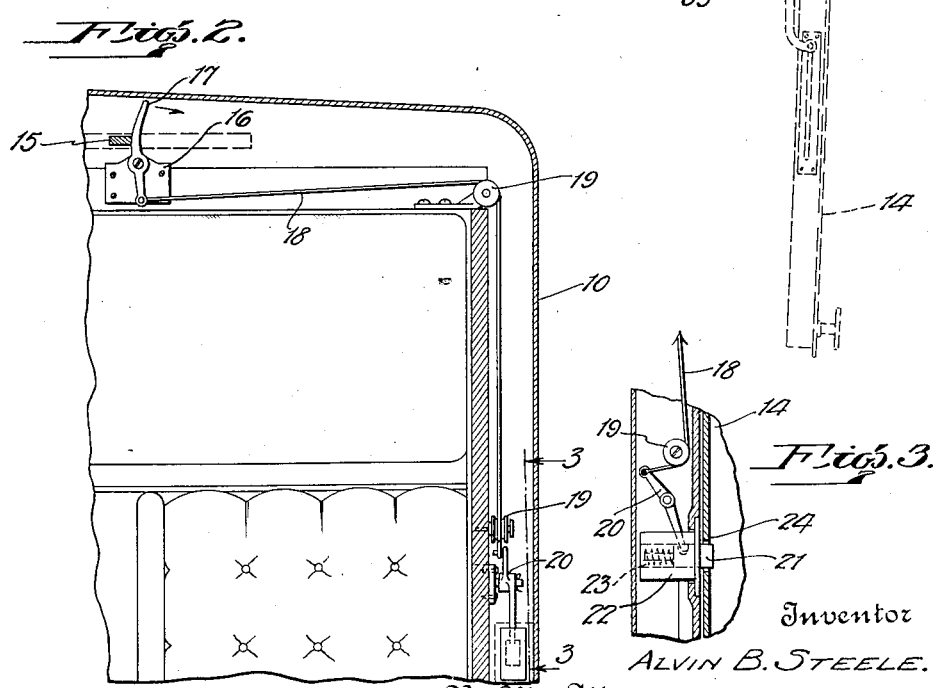
Inventor
ALVIN B. STEELE.
By His Attorneys Patented Aug. 14, 1934

1,969,767

UNITED STATES PATENT OFFICE 1,969,767

DOOR OPENING AND CLOSING DEVICE

Alvin B. Steele, New York, N. Y.

Application June 9, 1932, Serial No. 616,202

2 Claims. (Cl. 268—3)

This invention relates to improvements in door opening and closing devices, and more particularly to means for the operation of automobile doors.

One of the principal features of the invention resides in a mechanism which may be controlled from the front or driver's seat of an automobile to open and close the rear doors to eliminate the necessity of chauffeurs and taxi cab drivers leaving their seats or reaching out of the vehicle to courteously open and close the rear door for a passenger getting in and out.

Another object is the provision of an automobile door operating mechanism which when operated to open the door, successively moves the latch bolt to a retracted position and swings the door to a fully open position.

Another feature is to provide a device having the above features which is easy to install on automobiles now in use and which does not detract from the appearance of the vehicle.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a fragmentary top plan view of the body of an automobile with parts broken away in section showing my invention applied thereto, the dotted line position of one of the mechanisms showing the position of the parts when the door is in open position, Figure 2 is a detail vertical sectional view on the line 2—2 of Figure 1.

Figure 3 is a detail vertical sectional view on the line 3—3 of Figure 2.

Referring to the drawing by reference characters, the numeral 10 designates the body of a passenger automobile which is divided to include a front driver's compartment 11, and a rear passenger compartment 12. The driver's compartment 11 includes the driver's seat 13 disposed behind the steering wheel while outwardly swinging doors 14 are mounted in opposite sides of the passenger compartment 12 for the ingress and egress of passengers.

Associated with each of the doors 14 is a door operating mechanism A, and a description of one of the mechanisms will suffice for the other. Mounted above the driver's seat 13 adjacent the roof of the body 10 for horizontal movement is an actuating lever 15, which normally extends fore and aft of the body 10. Pivotally mounted upon a bracket 16 which is fixed to one of the cross bars or struts of the top construction of the body is a lever 17, the upper end of which extends into the path of the actuating lever 15, the opposite end of the said lever having one end of a pull cable 18 fixedly connected thereto.

The pull cable 18 is trained over pulley 19 and the opposite end is fixed to one end of a lever 20, the other end of the lever being operatively connected to the latch bolt 21 of a latch mechanism 22, the said latch bolt being normally extended by a spring 23. The latch bolt 21 engages in a keeper opening 24 provided in the door 14. By reference to Figure 2 it will be seen that when the actuating lever 15 moves the lever 17 in the direction of the arrow, a pull will be exerted upon the pull cable 18 which will cause the lever 20 to move the latch bolt 21 to a retracted position against the tension of the spring 23. The body may be constructed so as to completely house the parts hereinbefore described, with the exception of the manipulating end of the actuating lever 15.

The rear end of the actuating lever 15 is connected by a pin and slot connection 25 to one end of a transversely disposed link 26, the said link in turn being connected to one end of a rock lever 27, the opposite end of the said lever being pivotally connected to one end of a link 28. The link 28 is in turn connected to an arm 29 which is fixedly mounted adjacent the door 14 and is provided with a slot 30 for receiving the pin 31 carried by the link 28. The free end of the arm 29 is curved outwardly and carries a pin 32 which slides in a slot 33 provided in a plate 34 mounted on the top of the door 14.

The pin and slot connection 25 permits of the actuation of the latch releasing mechanism prior to the door operating mechanism and after the latch has been released by the movement of the lever 15, the said lever moves the links 26 and 28 and rock arm 27 to the dotted line position shown in Figure 1 whereupon the arm 29 forces the door 14 to open position. Hereinbefore, it is mentioned that the arm 29 was fixed, but only in the sense that it is attached to the body as the same is pivoted as at 35 so as to swing outwardly when the door moves to open position.

From the foregoing description it will be seen that by operating the actuating lever 15 in one direction, the door latch mechanism will first be released, whereupon the door operating mechanism swings the door to an open position.

By movement of the operating lever 15 in an opposite direction, the parts may be returned to original position. The links and levers of the door operating mechanism may be housed between the roof of the body and the usual ceiling covering.

While I have shown and described what I deem to be the most desirable embodiment of my invention, I wish it to be understood that such changes as come within the scope of the appended claims may be resorted to if desired.

Having thus described the invention, what I claim as new and desire to secure by Letters Patent is:—

1. In combination with an automobile body having a driver's seat and a passenger compartment rearward thereof in which a swinging door is mounted for ingress and egress to said compartment, an actuating lever pivoted to said body above said driver's seat, a rock lever, a link having one of its ends pivotally connected to one end of said rock lever, the other end of said link being connected to said actuating lever by a pin and slot connection, a slotted plate mounted on said door, an arm pivotally connected to said body adjacent said door and provided with an inwardly curved free end, a pin carried by the curved end of said arm and extending into the slot of said slotted plate, and a second link pivotally connected to the other end of said rock lever, and being joined to said arm by a pin and slot connection.

2. In combination with an automobile body having a driver's seat and a passenger compartment rearward thereof in which a swinging door is mounted for ingress and egress to said compartment and having a latch keeper, an actuating lever pivoted to said body above said driver's seat, releasable latch means for securing said door in a closed position including a spring actuated latch bolt for engagement with said latch keeper when said door is closed, a lever disposed in the path of movement of said actuating lever, a pull cable, one end of said pull cable being fixedly connected to said lever, and the other end to said latch bolt, pulleys over which said cable is trained, door opening mechanism comprising a rock lever, a link having one of its ends pivotally connected to one end of said rock lever, the other end of said link being connected to said actuating lever by a pin and slot connection, a slotted plate mounted on said door, an arm pivotally connected to said body adjacent said door and provided with an inwardly curved free end, a pin carried by the curved end of said arm and extending into the slot of said slotted plate, and a second link pivotally connected to the other end of said rock lever and being joined to said arm by a pin and slot connection, whereby said actuating lever when moved in one direction will strike said lever and exert a pull on said pull cable to move said latch bolt to released position against the spring action from said latch keeper and successively actuate said rock lever to swing said door to an open position.

ALVIN B. STEELE.